United States Patent
Guo et al.

(10) Patent No.: US 7,746,594 B1
(45) Date of Patent: *Jun. 29, 2010

(54) DISK DRIVE COMPRISING SLANTED LINE SERVO BURST SETS OFFSET RADIALLY

(75) Inventors: Guoxiao Guo, Foothill Ranch, CA (US); Jie Yu, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/240,374

(22) Filed: Sep. 29, 2008

(51) Int. Cl.
*G11B 5/596* (2006.01)

(52) U.S. Cl. .................. 360/77.05; 360/77.08

(58) Field of Classification Search ............ None
See application file for complete search history.

(56) References Cited

U.S. PATENT DOCUMENTS

| | | | |
|---|---|---|---|
| 4,549,232 A | 10/1985 | Axmear et al. | |
| 5,689,384 A | 11/1997 | Albrecht et al. | |
| 6,219,197 B1 | 4/2001 | Brown et al. | |
| 6,256,160 B1 | 7/2001 | Liikanen et al. | |
| 6,304,407 B1 | 10/2001 | Baker et al. | |
| 6,590,729 B1 | 7/2003 | Akagi et al. | |
| 6,754,016 B2 | 6/2004 | Messner et al. | |
| 6,757,116 B1 * | 6/2004 | Curtiss et al. ............ 360/15 | |
| 6,781,778 B1 | 8/2004 | Molstad et al. | |
| 6,961,203 B1 | 11/2005 | Baker | |
| 6,967,808 B1 | 11/2005 | Bandic et al. | |
| 6,977,789 B1 | 12/2005 | Cloke | |
| 6,999,258 B2 | 2/2006 | Molstad et al. | |
| 7,002,763 B2 | 2/2006 | Bui et al. | |
| 7,009,802 B1 | 3/2006 | Ehrlich | |
| 7,019,925 B2 | 3/2006 | Ehrlich | |
| 7,054,092 B2 | 5/2006 | Ehrlich | |
| 7,085,093 B2 * | 8/2006 | Oki .......................... 360/75 |
| 7,092,182 B2 | 8/2006 | Ehrlich et al. | |
| 7,092,183 B2 | 8/2006 | Ehrlich | |
| 7,167,329 B2 | 1/2007 | Baker | |
| 7,206,148 B2 | 4/2007 | Ehrlich | |
| 7,236,325 B2 * | 6/2007 | Albrecht et al. ......... 360/77.08 |
| 7,298,582 B2 | 11/2007 | Asakura et al. | |
| 7,312,939 B2 * | 12/2007 | Bandic et al. ............ 360/15 |
| 7,355,810 B2 | 4/2008 | Asakura | |
| 7,440,224 B2 * | 10/2008 | Ehrlich et al. ........... 360/77.08 |
| 2005/0180040 A1 | 8/2005 | Dugas et al. | |
| 2005/0259364 A1 | 11/2005 | Yip | |
| 2006/0044671 A1 | 3/2006 | Weber et al. | |
| 2007/0025010 A1 | 2/2007 | Miles | |

OTHER PUBLICATIONS

Che et al, "Study of Lithographically Defined Data Track and Servo Patterns", IEEE Transactions on Magnetics, vol. 43, No. 12, Dec. 2007, pp. 4106-4112.
Office Action dated Oct. 23, 2009 from U.S. Appl. No. 12/240,254, 11 pages.
Notice of Allowance dated Feb. 25, 2010 from U.S. Appl. No. 12/240,254, 7 pages.

* cited by examiner

*Primary Examiner*—K. Wong

(57) ABSTRACT

A disk drive is disclosed comprising a disk having servo data defining a plurality of servo tracks. The servo data comprises a preamble, and a plurality of slanted line servo bursts recorded at a tilt angle with respect to the preamble. The slanted line servo bursts comprises a first plurality of slanted line servo bursts and a second plurality of slanted line servo bursts, wherein the second plurality of slanted line servo bursts are offset radially from the first plurality of slanted line servo bursts. A position error signal (PES) is generated in response to a phase difference when reading the preamble and the slanted line servo bursts.

12 Claims, 5 Drawing Sheets

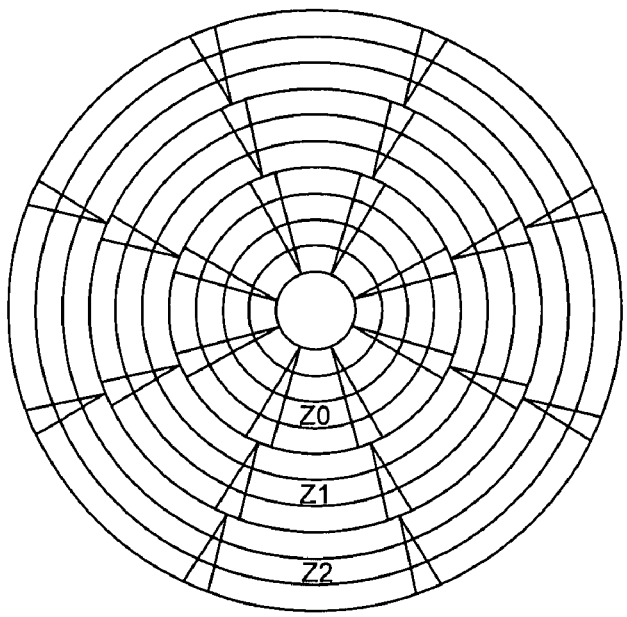
FIG. 2
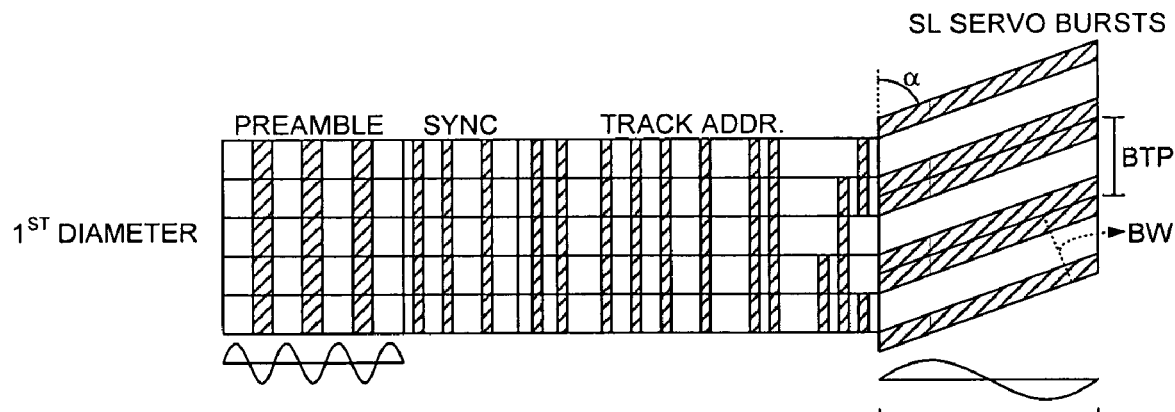
FIG. 3A
$\alpha = \text{atan}(BL/BTP)$
$BW = \sin(\alpha) \cdot BTP$
FIG. 3B

DISK DRIVE COMPRISING SLANTED LINE SERVO BURST SETS OFFSET RADIALLY

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address and servo bursts) which is read by the head and processed by a servo control system to control the velocity of the actuator arm as it seeks from track to track.

Various patterns have been employed to record the servo bursts in the servo sectors, such as a quadrature (A,B,C,D) servo pattern comprising squared bursts of transitions each recorded at a precise interval and offset from a servo track centerline. A position error signal (PES) is generated by demodulating and comparing the amplitude of each servo burst (A,B,C,D) relative to one another. Another known servo pattern comprises slanted line servo bursts recorded at a tilt angle with respect to the preamble of the servo sector. The PES is generated by comparing a phase difference between the preamble signal and the burst signal generated as the head passes over the slanted lines.

BRIEF DESCRIPTION OF THE DRAWINGS

FIG. 2 shows an embodiment of the present invention wherein the disk comprises zoned servo data sectors.

FIG. 3A shows an embodiment of the present invention wherein the slanted line servo bursts comprise a track pitch twice the track pitch of the servo tracks.

FIG. 3B shows equations for defining the tilt angle and burst width relative to the burst length and the track pitch of the slanted line servo bursts.

DETAILED DESCRIPTION OF EMBODIMENTS OF THE INVENTION

Figure 1A:
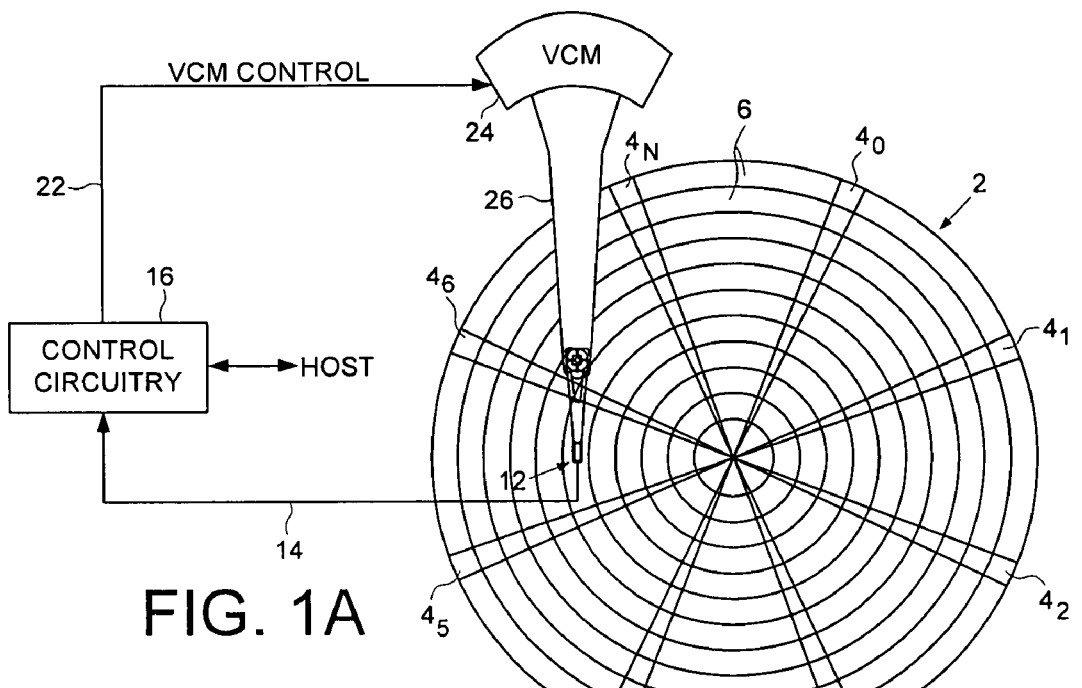
FIG. 1A shows a disk drive according to an embodiment of the present invention comprising a disk having servo data defining a plurality of servo tracks.
Figure 1B:
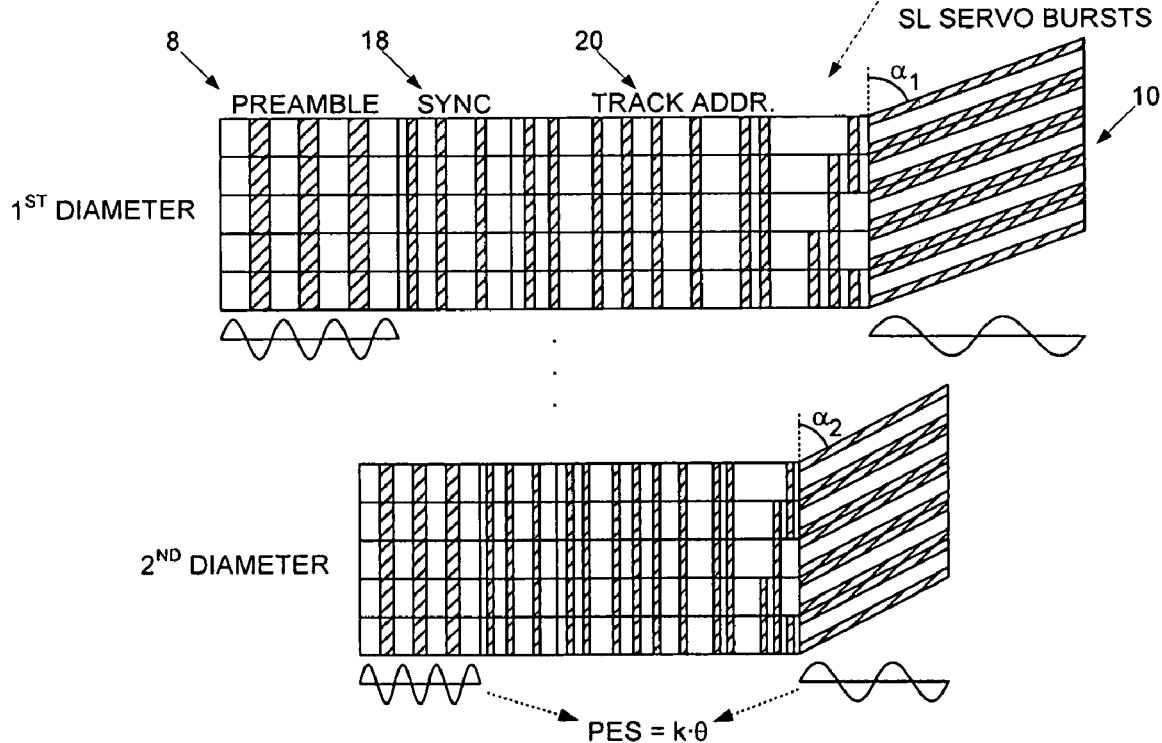
FIG. 1B shows an embodiment of the present invention wherein the servo data comprises a preamble having a length that varies across the radius of the disk, and a plurality of slanted line servo bursts having a tilt angle that varies across the radius of the disk.

FIG. 1A shows a disk drive according to an embodiment of the present invention comprising a disk 2 including servo data recorded in servo sectors $4_0$-$4_N$ defining a plurality of servo tracks 6. FIG. 1B shows an example format of the servo data recorded in servo sector $4_3$ as comprising a preamble 8 having a varying length across the radius of the disk 2, and a plurality of slanted line servo bursts 10 recorded at a tilt angle with respect to the preamble 8. The tilt angle $\alpha$ varies across the radius of the disk 2 commensurate with the varying length of the preamble 8. The disk drive further comprises a head 12 actuated radially over the disk 2 for generating a read signal 14, and control circuitry 16 operable to position the head 12 over the disk by processing the preamble 8 and slanted line servo bursts 10. A preamble read signal is generated when the head 12 passes over the preamble 8, and a burst read signal is generated when the head 12 passes over at least one of the slanted line servo bursts 10. A position error signal (PES) is generated in response to a phase difference between the preamble read signal and the burst read signal, wherein the PES is used to position the head 12.

In the embodiment of FIG. 1B, the servo data in a servo sector further comprises a sync mark 18 for storing a special pattern used to symbol synchronize to a track address field 20. The track address field 20 stores a track address in a suitable format (e.g., a Gray code) which is used to position the head over a target data track during a seek operation. The control circuitry 16 demodulates the servo data in the servo sectors to generate the PES, and filters the PES using a suitable compensation filter to generate a control signal 22 applied to a voice coil motor (VCM) 24. The VCM 24 rotates an actuator arm 26 in order to move the head 12 in a direction that reduces the PES.

In the embodiment of FIG. 1B, the servo data is recorded using a discrete track recording (DTR) technique. With DTR, the surface of the disk 2 is fabricated with lands and grooves, wherein the lands comprise a suitable magnetic material and the grooves comprise a suitable non-magnetic material. In the example of FIG. 1B, the grooves are represented by the shaded areas and the lands are represented as the non-shaded areas. The magnetic material in the lands is magnetized (e.g., DC erased) to have a predetermined polarity. As the head 12 passes over the lands and grooves pulses are induced in the read signal 14 representing the recorded data. In the embodiment shown in FIG. 1B, the digital data in a servo sector (e.g., the sync mark and track address) modulate the fabrication process such that a "0" bit is recorded as a land and a "1" bit is recorded as a groove. In an alternative embodiment, a "0" bit may be recorded as land followed by a groove, and a "1" bit may be recorded as a groove followed by a land.

In the embodiment of FIG. 1B, the slanted line servo bursts 10 are recorded as interleaved segments of lands and grooves such that the head 12 generates a periodic servo burst read signal having a frequency related to the frequency of the preamble read signal. As the head 12 deviates radially relative to the servo tracks, a PES is generated in response to a phase offset $\theta$ between the preamble read signal and the servo burst read signal as shown in FIG. 1B. The phase offset $\theta$ may be generated in any suitable manner, such as by computing a Discrete Time Fourier Transform (DTFT) or a trigonometric function of the preamble read signal and the servo burst read signal. The relationship between the phase offset $\theta$ and the PES depends on the relationship between the frequency of the preamble read signal and the frequency of the servo burst read signal. The frequency of the preamble read signal depends on the frequency of the transitions recorded in the preamble field 8 (e.g., a 2T preamble), and the frequency of the servo burst read signal depends on the geometry of the slanted line servo bursts 10, including the tilt angle $\alpha$ as well as the track pitch.

In one embodiment, the servo sectors $4_0$-$4_N$ are recorded on the disk such that when the disk 2 is rotated at a constant angular velocity, the servo data comprises a constant data rate across the disk radius. Since the inner diameter of the disk 2 will rotate slower than the outer diameter of the disk 2, the length of the preamble 8 will decrease toward the inner diameter of the disk 2 as illustrated in FIG. 1B. In one embodiment, the tilt angle α of the slanted line servo bursts 10 varies across the radius of the disk commensurate with the varying length of the preamble 8. In the example shown in FIG. 1B, the tilt angle α1 at a first (outer) diameter of the disk is greater than the tilt angle α2 at a second (inner) diameter of the disk. Varying the tilt angle α across the radius of the disk 2 simplifies computing the PES by maintaining a substantially constant relationship between the frequency of the preamble read signal and the frequency of the servo burst read signal.

In the embodiment of FIG. 1A, the servo sectors $4_0$-$4_N$ are recorded so as to generate a constant data rate across the entire radius of the disk. This results in a single servo wedge format from an outer diameter of the disk toward the inner diameter of the disk. In an alternative format shown in FIG. 2, the servo sectors are recorded in servo zones (e.g., Z0, Z1, Z2) wherein the data rate is increased toward the outer diameter of the disk to achieve a more constant linear bit density. In the zoned servo sector embodiment, the servo sectors form servo wedges within each servo zone such that the preamble length and tilt angle of the slanted line servo bursts vary across each servo zone.

The slanted line servo bursts 10 may be recorded at any suitable track pitch. In the embodiment of FIG. 1B, the slanted line servo bursts 10 are recorded at a track pitch equal to the servo track pitch (the track pitch of the track addresses). In an embodiment shown in FIG. 3A, the slanted line servo bursts 10 are recorded at a track pitch twice the servo track pitch. Selecting a larger track pitch for the slanted line servo bursts 10 may improve the quality of the read signal by immersing more of the head 12 in the lands and the grooves. In one embodiment, the track pitch of the slanted line servo bursts 10 remains constant over the disk radius, and in an alternative embodiment, the track pitch of the slanted line servo bursts varies over the radius of the disk. In the embodiment where the track pitch varies, the equation for computing the PES in response to the phase difference is adjusted accordingly.

In one embodiment, a desired burst track pitch (BTP) and a desired burst length (BL) is selected for the slanted line servo bursts 10 based on suitable design criteria, such as signal quality, servo sector density, and track pitch of the data tracks. Once the BTP and BL are selected, the tilt angle α and the burst width (BW) for the slanted lines may be computed based on the equations shown in FIG. 3B. The burst length (BL) corresponds to the physical length of a slanted line servo burst along the circumferential direction of the disk over one cycle of the resulting servo burst read signal. In the embodiment of FIG. 3A, the total length of a slanted line servo burst equals one BL, whereas in the embodiment of FIG. 1B the total length of a slanted line servo burst equals two BLs. Increasing the total length of the slanted line servo bursts 10 improves the accuracy of the measured phase, but reduces the overall format efficiency by using disk area that could otherwise be used to record user data.

Figure 4A:
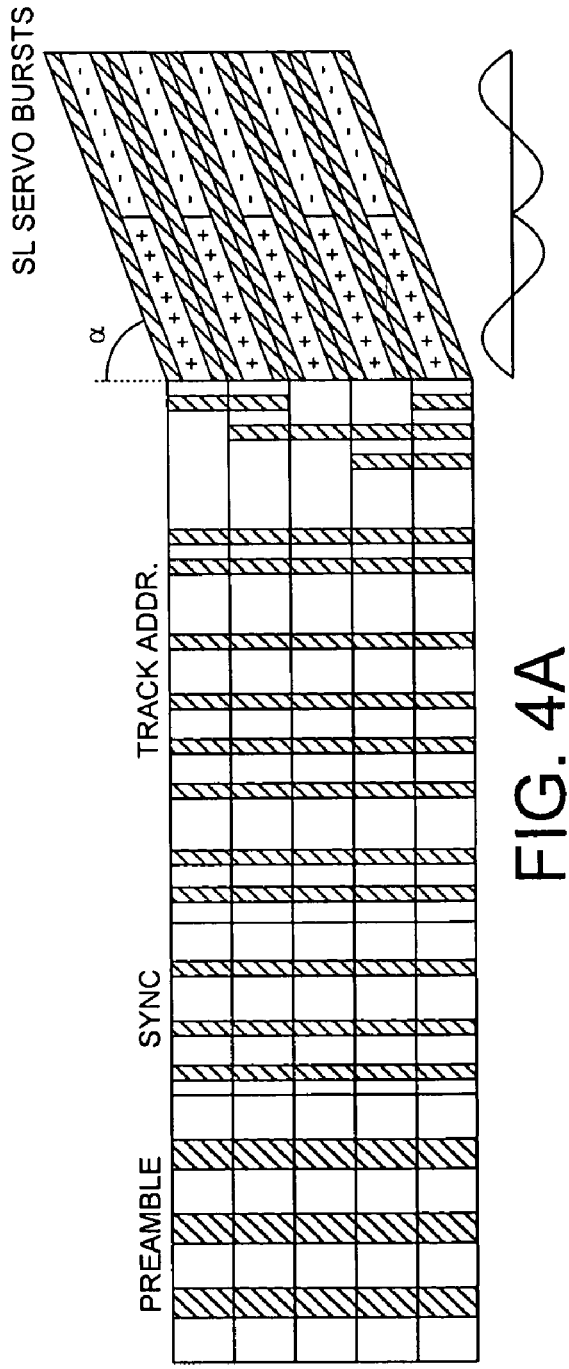
FIGS. 4A-4B show an embodiment of the present invention wherein at least one of the slanted line servo bursts comprises a first polarity along a first segment of the slanted line and a second polarity along a second segment of the slanted line.
Figure 4B:
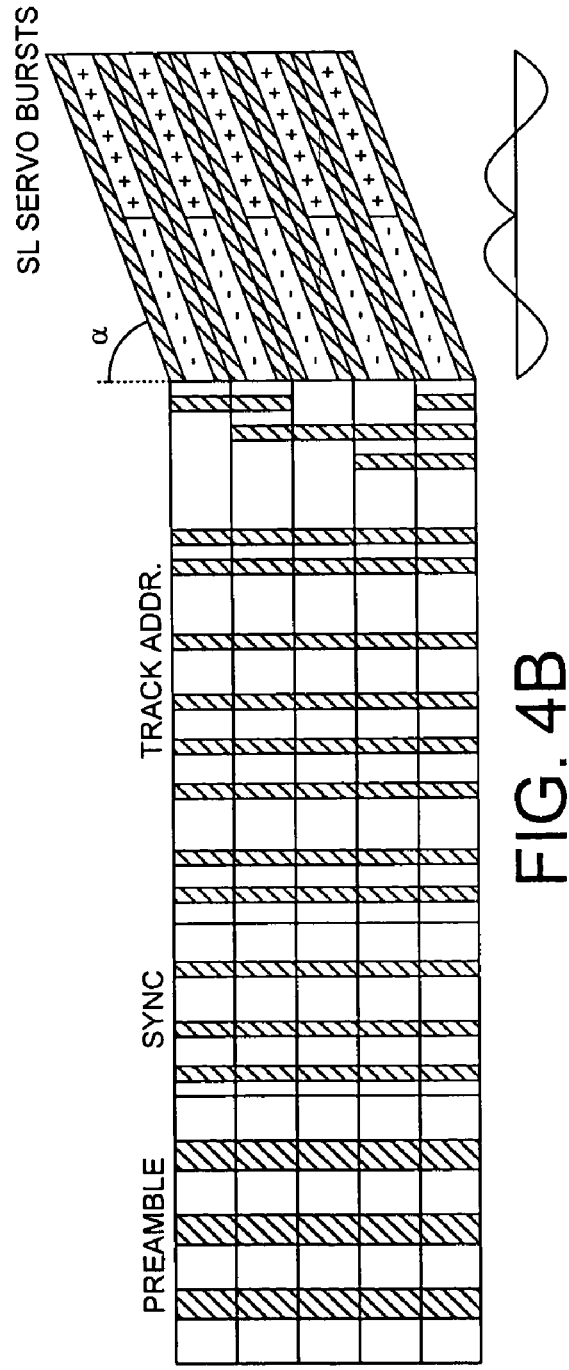

The process of recording the slanted line servo bursts 10 on the disk may result in an asymmetrical read signal. For example, with DTR the read signal generated from reading the lands may be asymmetrical compared to the read signal generated from reading the grooves. In an embodiment shown in FIG. 4A, this asymmetry is compensated by recording at least one of the slanted line servo bursts with a first polarity along a first segment of the slanted line and a second polarity along a second segment of the slanted line. As illustrated in FIG. 4A, a phase of the periodic signal when reading the slanted line servo bursts changes 180 degrees at the transition between the first segment and the second segment which helps compensate for asymmetry. Any suitable polarity configuration may be employed in the embodiments of the present invention, such as the polarity configuration shown in FIG. 4B.

In one embodiment, the phase of the servo burst read signal is generated over multiple timing windows corresponding to the polarity of each segment. In the embodiment of FIG. 4A, the phase of the servo burst read signal may be generated over the "+" segment, and then added to the phase generated over the "−" segment offset by 180 degrees. In addition, the phase of the servo burst read signal may be generated over more than the two cycles shown in FIG. 4A by selecting a suitable geometry for the slanted line servo bursts (e.g., selecting a suitable burst length (BL) and/or burst track pitch (BTP) and/or tilt angle (α)). Increasing the number of cycles to generate the phase of the servo burst signal may improve the asymmetry compensation.

Figure 5A:
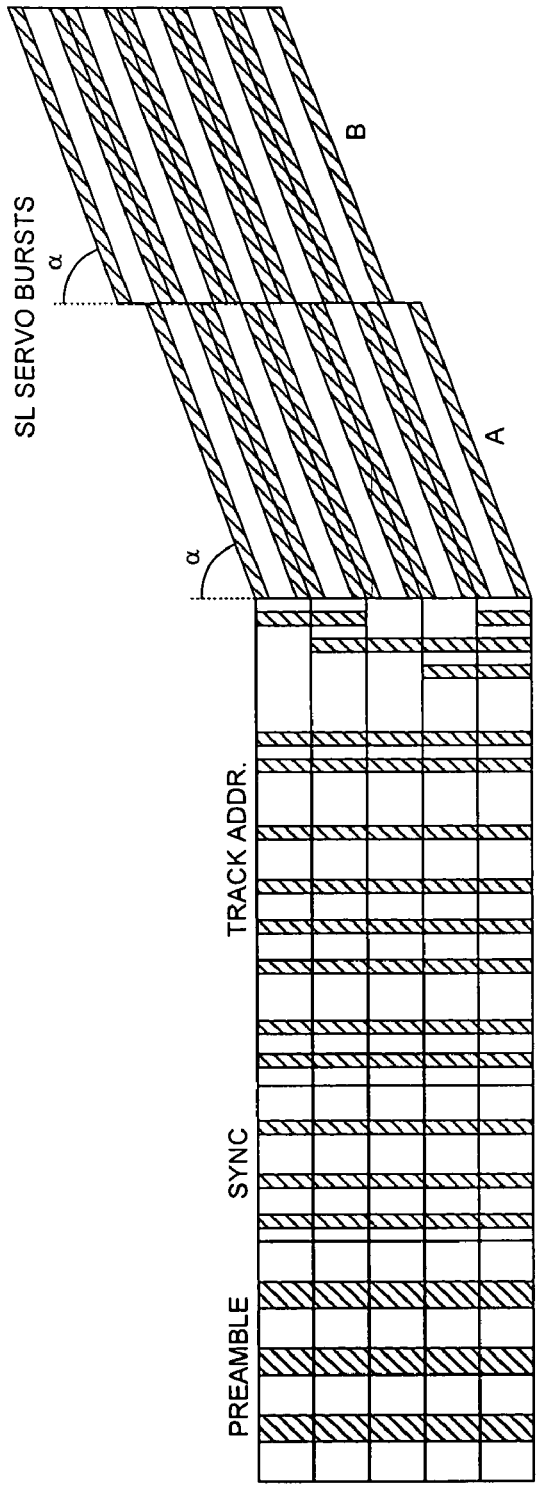
FIGS. 5A-5B show an embodiment of the present invention wherein the slanted line servo bursts comprises a first plurality of slanted line servo bursts and a second plurality of slanted line servo bursts, and the second plurality of slanted line servo bursts are offset radially from the first plurality of slanted line servo bursts.

FIG. 5A illustrates another embodiment of the present invention wherein the slanted line servo bursts comprises a first plurality of slanted line servo bursts A and a second plurality of slanted line servo bursts B, wherein the second plurality of slanted line servo bursts B are offset radially from the first plurality of slanted line servo bursts A. In the embodiment of FIG. 5A, the second plurality of slanted line servo bursts B are offset by a half track pitch of the slanted line servo bursts. This embodiment may help compensate for distortions in the PES that can occur at certain head offsets. In one embodiment, a phase measurement is generated for each set of slanted line servo bursts A and B, and the phase measurement corresponding to the highest SNR selected to compute the PES. In another embodiment, the phase measurement generated for both sets of slanted line servo bursts A and B are combined with an 180 degree offset, and the resulting combined phase used to generate the PES.

Figure 5B:
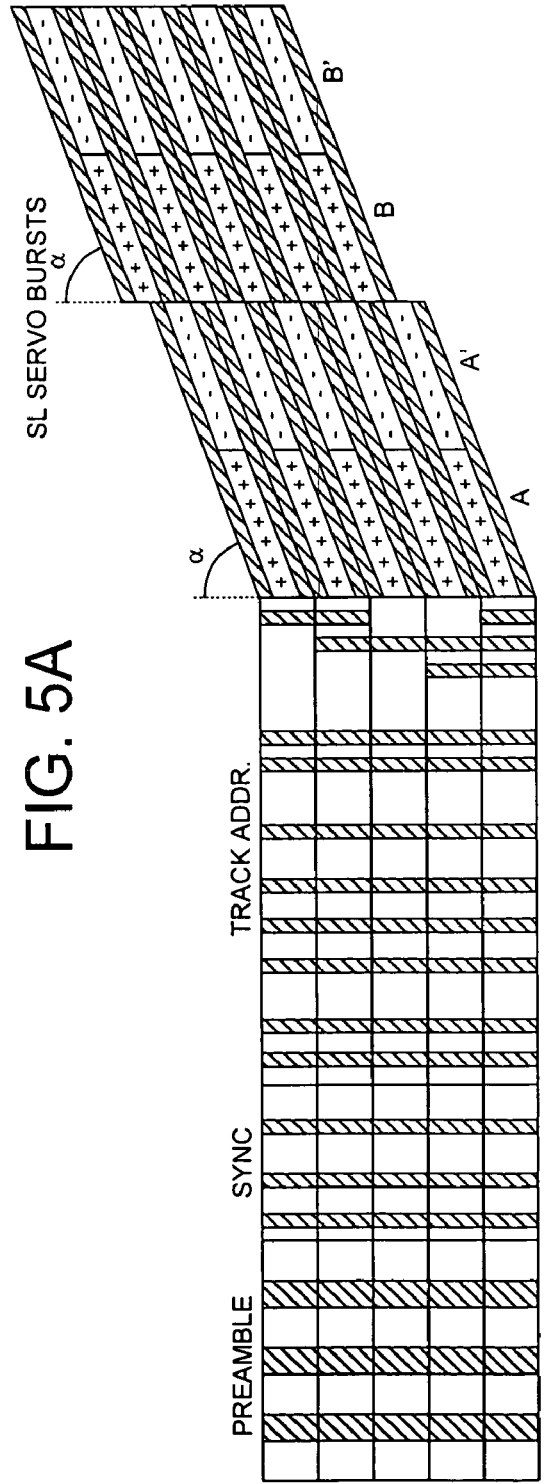

FIG. 5B shows an embodiment of the present invention which combines the aspect of FIG. 4A with the aspect of FIG. 5A such that each set of slanted line servo bursts comprises two or more segments of opposite polarity. In the example of FIG. 5B, the first set of slanted line servo bursts comprise an A segment and an A' segment of opposite polarity, and the second set of slanted line servo bursts comprise a B segment and a B' segment of opposite polarity. As the head passes over the slanted line servo bursts, the read signal comprises a pattern of the form A,A',B,B'. However, the slanted line servo bursts may be recorded in any suitable manner to achieve any suitable sequence of servo burst read signals, such as A,B,A', B'.

In FIGS. 4A-5B the burst track pitch (BTP) equals the track pitch of the servo tracks. However, any suitable BTP may be selected for the embodiments shown in FIGS. 4A-5B, such as a BTP that is twice the track pitch of the servo tracks as shown in the embodiment of FIG. 3A.

Figure 6:
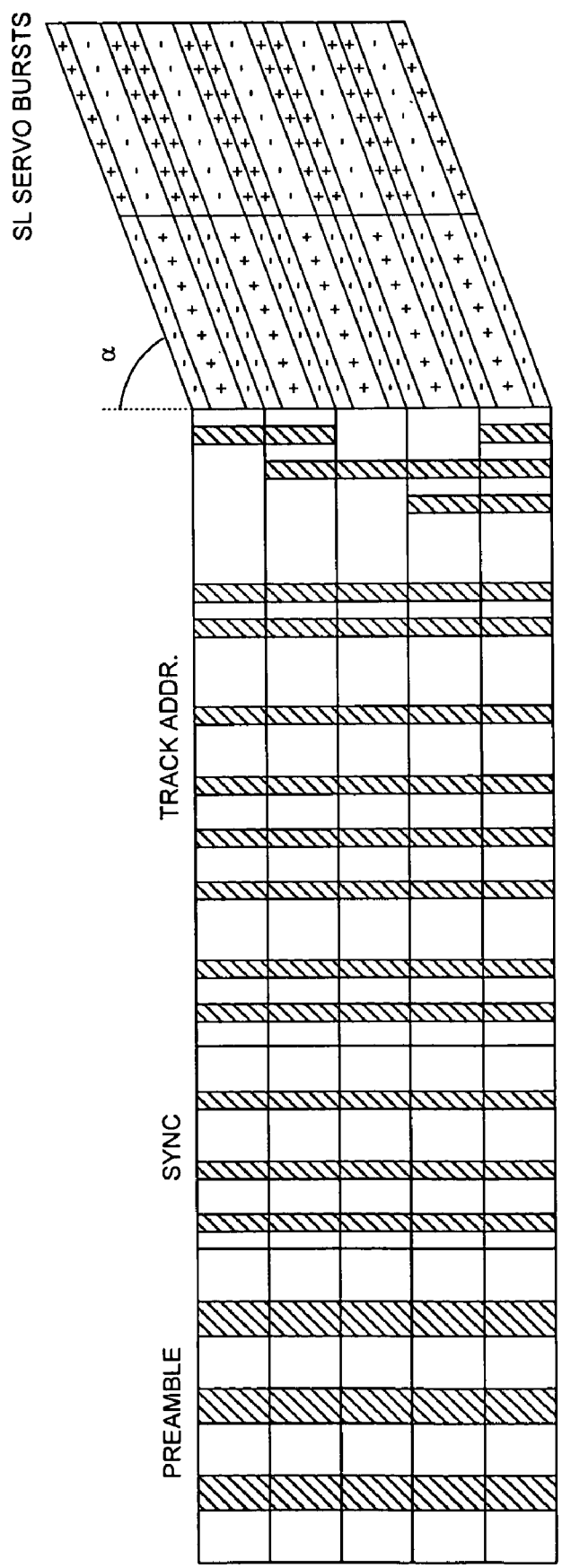
FIG. 6 shows an embodiment of the present invention wherein the servo data is printed on the disk using any suitable servo pattern printing technique.

Any suitable technique may be employed to record the servo data in the servo sectors, such as the above described DTR technique. Another known technique is referred to as "servo pattern printing" (SPP) wherein the disk is fabricated with a magnetic material across the entire surface and initialized to a desired polarity (DC erased). A master stamping disk is created having the desired magnetic pattern which is "stamped" onto one of the DC erased disks to thereby magnetically print the servo data onto the disk. An example embodiment of using SPP to record the servo data is shown in FIG. 6 wherein the shaded areas of the digital data is magnetized by the master stamping disk to have an opposite polarity of the non-shaded areas. The slanted line servo bursts are formed in a similar manner by DC erasing the slanted lines to a first polarity (e.g., "+"), and then master stamping the disk to record an opposite polarity (e.g., "−") to form the desired slanted line pattern such as shown in FIG. 6.

Although not illustrated in the figures, in other embodiments of the present invention the servo patterns may comprise suitable gaps, such as a gap between the Gray coded track address 20 and the slanted line servo bursts 10 of FIG. 1B, as well as a gap following the slanted line servo bursts 10.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising servo data defining a plurality of servo tracks, wherein the servo data comprises:
        a preamble comprising a varying length across a radius of the disk; and
        a plurality of slanted line servo bursts recorded at a tilt angle with respect to the preamble, wherein:
            the slanted line servo bursts comprises a first plurality of slanted line servo bursts and a second plurality of slanted line servo bursts; and
            the second plurality of slanted line servo bursts are offset radially from the first plurality of slanted line servo bursts by a fraction of a servo track;
    a head actuated radially over the disk for generating a read signal; and
    control circuitry operable to:
        generate a preamble read signal when the head passes over the servo data preamble;
        generate a burst read signal when the head passes over at least one of the slanted line servo bursts;
        generate a position error signal (PES) in response to a phase difference between the preamble read signal and the burst read signal; and
        position the head in response to the PES.

2. The disk drive as recited in claim 1, wherein the second plurality of slanted line servo bursts are offset by a half track pitch of a servo track.

3. The disk drive as recited in claim 1, wherein the servo data is recorded on the disk by fabricating magnetic slants and non-magnetic grooves.

4. The disk drive as recited in claim 1, wherein the servo data is recorded on the disk by stamping a servo pattern on the disk using a master stamping disk.

5. A method of writing servo data to define a plurality of servo tracks on a disk of a disk drive comprising:
    recording a preamble; and
    recording a plurality of slanted line servo bursts at a tilt angle with respect to the preamble, wherein:
        the slanted line servo bursts comprises a first plurality of slanted line servo bursts and a second plurality of slanted line servo bursts; and
        the second plurality of slanted line servo bursts are offset radially from the first plurality of slanted line servo bursts by a fraction of a servo track.

6. The method as recited in claim 5, wherein the second plurality of slanted line servo bursts are offset by a half track pitch of a servo track.

7. The method as recited in claim 5, wherein the servo data is recorded on the disk by fabricating magnetic slants and non-magnetic grooves.

8. The method as recited in claim 5, wherein the servo data is recorded on the disk by stamping a servo pattern on the disk using a master stamping disk.

9. A disk for use in a disk drive, the disk comprising servo data defining a plurality of servo tracks, the servo data comprising:
    a preamble comprising a varying length across a radius of the disk; and
    a plurality of slanted line servo bursts recorded at a tilt angle with respect to the preamble, wherein:
        the slanted line servo bursts comprises a first plurality of slanted line servo bursts and a second plurality of slanted line servo bursts; and
        the second plurality of slanted line servo bursts are offset radially from the first plurality of slanted line servo bursts by a fraction of a servo track.

10. The disk as recited in claim 9, wherein the second plurality of slanted line servo bursts are offset by a half track pitch of a servo track.

11. The disk as recited in claim 9, wherein the servo data is recorded on the disk by fabricating magnetic slants and non-magnetic grooves.

12. The disk as recited in claim 9, wherein the servo data is recorded on the disk by stamping a servo pattern on the disk using a master stamping disk.

\* \* \* \* \*